May 25, 1965   D. A. BUCKNER   3,185,750
METHOD FOR FORMING DIELECTRIC ELEMENTS
Filed Dec. 20, 1962

FIG. 2

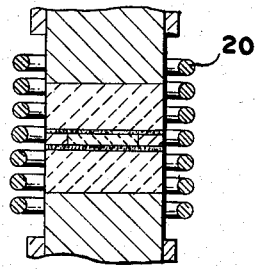

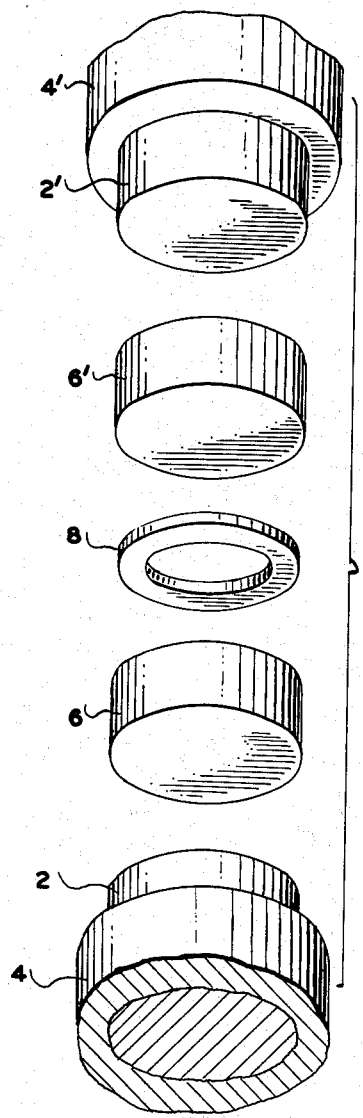

FIG. 1

| PROVIDING A NOBLE METAL ANNULUS |
|---|
| CONFINING PULVERULENT ALKALI NIOBATE IN A NOBLE METAL ANNULUS |
| PREPACKING THE CONFINED PULVERULENT MASS |
| ENVELOPING THE PRE-PACKED PULVERULENT MASS WITH NON-REACTIVE POWDER |
| PLACING THE ENVELOPED MASS BETWEEN CERAMIC PLUNGERS |
| COMPRESSING AND HEATING THE COMPOSITE STRUCTURE |

FIG. 3

INVENTOR.
DEAN A. BUCKNER
BY *Frank C. Parker*
*David E. Dougherty*
ATTORNEYS

3,185,750
METHOD FOR FORMING DIELECTRIC ELEMENTS

Dean A. Buckner, Perinton, N.Y., assignor to Bausch & Lomb Incorporated, Rochester, N.Y., a corporation of New York
Filed Dec. 20, 1962, Ser. No. 246,232
5 Claims. (Cl. 264—294)

This invention relates to a novel method for forming dielectric elements and more particularly to a method for hot pressing ceramics such as barium titanate and/or sodium-potassium niobate transducers.

The increased interest in solid state ultrasonic delay line applications has resulted in an increased demand for thin section transducers. In view of the demand for transducers, efforts have been made to produce electro-mechanical transducers at a more economical cost. These efforts have in some cases been directed to producing niobate systems which are characterized by having a range of approximately 10 to 20 megacycles per second. Niobate systems and a method of producing them are described in an article by R. E. Jaeger and L. Edgerton in the May 1962 issue of the "Journal of American Ceramic Society, Chemical Abstracts."

Niobate transducers may be made with a suitable die and furnace. Generally an iron nickel cobalt susceptor which is approximately 3" in diameter and 2" in height is heated in a radio frequency field. The field is generated within a water cooled copper coil approximately 8" in diameter. A fused silica tube and fire-brick insulation are provided in order to decrease the radiant heat loss. The susceptor includes an alumina or a zirconia lining which forms a die wall. Alumina or zirconia rods or plungers are used for transmitting pressure to a preformed disc consisting of a niobate composition.

The niobate disc is generally about ½" in diameter and approximately ⅛" thick. This disc is imbedded in a fine high purity zirconia powder through which the pressure is transmitted. This powder separates the reactive niobate from the walls of the die and the faces of the plungers, and allows ejection of the disc at the completion of the cycle. Conventional hydraulic rams are used for applying pressure to the rods.

One serious problem associated with the aforementioned process is that a relatively high rejection rate is encountered. The rejection rate is caused by cracking of the disc during the pressing operation or during the cooling and removal stages. The costs are further increased by the necessity of frequently replacing the ceramic tubes which are used in the process. These tubes are manufactured to relatively close tolerances from relatively pure alumina or zirconia in order to eliminate contamination or reduction of the niobate during the process. These ceramic tubes are relatively expensive, and since they are damaged by both mechanical and heat shock, they seldom last for more than a few cycles.

It is contemplated by the present invention to provide a new and improved method for forming niobate transducers. The new method is effective to reduce the rejection rate of niobate transducers. Furthermore the method is relatively inexpensive and tends to protect the niobate from contamination or reduction while the niobate is maintained at a high temperature and pressure. Another advantageous feature of the invention is that it tends to overcome point stresses which may result in unacceptable transducers.

Briefly, the novel method according to the present invention includes the steps of providing a noble metal annulus preferably of platinum, and placing pulverulent alkali niobate within the cavity defined by the annulus to thereby confine the pulverulent material. The annulus is deformed by unidirectional pressing at a pressure within the range of 1500 to 6000 p.s.i. to thereby compress the pulverulent material. During the pressing operation the annulus and material confined therein are heated to a temperature within the range of 1800° to 2350° F. Subsequently, the composite structure is cooled and the compact alkali niobate transducer is removed from the deformed annulus.

The invention will now be described in more detail in combination with the accompanying drawings, in which, FIG. 1 is an exploded perspective view illustrating apparatus which is suitable for carrying out the method according to the present invention;

FIG. 2 is a cross sectional view of apparatus which is generally similar to the apparatus shown in FIG. 1 but includes a powder envelope and heating means; and, FIG. 3 is a block diagram illustrating the major method steps according to the invention.

The apparatus shown in FIGS. 1 and 2 includes a pair of hydraulic rams 2, 2' which are part of the pressure exerting means 4, 4'. A pair of ceramic plungers 6, 6' are disposed between the hydraulic rams 2, 2'. The plungers 6, 6' have a cylindrical shape and are placed in coaxial alignment between the hydraulic rams. A noble metal annulus 8 which is disposed between the plungers 6, 6' defines a cavity for confining pulverulent alkali niobate.

The alkali niobate is pre-packed within the ring structure by placing the ring on a suitable support, filling the ring with alkali niobate, and packing the powdered niobate to form a composite structure. This structure is placed between the ceramic plungers 6, 6' and is separated therefrom by layers of non-reactive powder. This non-reactive powder may be a relatively pure alumina or zirconia, and separates the niobate confined by the annulus from the plungers 6, 6'.

The enveloped alkali niobate pre-pack is placed between the plungers 6, 6' and pressure is exerted through the non-reactive powder to the niobate and the annulus by the rams 2, 2'. While the annulus 8 and pulverulent material 10 is being compressed, heat is applied to the composite structure by means of the concentric rings 20 and induction heating means (not shown).

The method outlined in FIG. 3 includes the step of providing a noble metal annulus. Preferably the annulus has a ring shape. The ring defines a cavity which confines pulverulent alkali niobate. The pre-packing operation consists of placing the ring upon a suitable platform, filling the ring, compacting the pulverulent mass, adding additional material and packing the additional material until a coherent composite mass is obtained. The addition and packing operations may be repeated several times before a suitable compact is obtained. The composite structure is then placed in an envelope of non-reactive powder. The enveloping operation may be performed by placing a layer of non-reactive powder on a ceramic plunger, placing the composite structure including the annulus and niobate pre-pack on top of the powder layer and adding an additional layer of powder to cover the composite structure. A second ceramic plunger is placed on top of the envelope and the entire assembly is compressed by a pair of hydraulic rams.

The uni-directional pressing applied by the hydraulic rams deforms the annulus to thereby compress the niobate. The preferred pressure for the pressing of sodium-potassium niobate is about 5600 p.s.i. During the pressing operation the temperature is raised to between 2030° and 2050° F. The relatively high temperature and pressure are maintained for over 15 minutes and preferably for 20–30 minutes. After pressing the structure is cooled to ambient temperature and removed from the ring. The cooling rate is not critical and may vary substantially. It is desirable, however, to avoid thermal shock. In carrying out the novel method according to the invention the heat is applied by means of the coils 20 which are operatively connected to a suitable heater.

What is claimed is:

1. A method of forming transducers comprising the steps of providing a platinum annulus, placing pulverulent alkali niobate in the cavity defined by the annulus, deforming the annulus by uni-directional pressing at a pressure within the range of 1500 to 6000 p.s.i. to thereby compress the alkali niobate, and heating the alkali niobate to a temperature within the range of 1800° to 2350° F. simultaneously with the pressing operation.

2. A method of forming transducers comprising the steps of providing a platinum ring confining pulverulent alkali niobate in the cavity defined by the ring, pre-packing the confined alkali niobate to form a coherent mass, deforming the ring by uni-directional pressing at a pressure within the range of 1500 to 6000 p.s.i. to thereby compress the alkali niobate, and heating the alkali niobate to a temperature within the range of 1800° to 2350° F. simultaneously with said pressing operation.

3. A method of forming transducers comprising the steps of providing a platinum ring, filling the cavity defined by the platinum ring with sodium-potassium niobate, pre-packing the confined sodium-potassium niobate to form a coherent mass, enveloping the coherent mass with non-reactive powder, deforming the ring by uni-directional pressing at a pressure of 1500 to 6000 p.s.i. to thereby compress the sodium-potassium niobate, and heating the alkali niobate to a temperature within the range of 1800° to 2350° F. simultaneously with said pressing operation.

4. A method of forming transducers comprising the steps of providing a platinum ring, filling the cavity defined by the platinum ring with sodium-potassium niobate, pre-packing the confined sodium-potassium niobate to form a coherent mass, enveloping the coherent mass with non-reactive powder, deforming the ring by uni-directional pressing at a pressure within the range of 1500 to 6000 p.s.i. to thereby compress the sodium-potassium niobate, heating the alkali niobate to a temperature within the range of 1800° to 2350° F. simultaneously with said pressing operation, and maintaining said elevated temperature and said pressure for a period of at least 15 minutes.

5. A method of forming a sodium-potassium niobate transducer comprising the steps of providing a platinum ring, filling the cavity defined by the platinum ring with sodium-potassium niobate, pre-packing the confined sodium-potassium niobate to form a composite coherent mass, enveloping the coherent mass with relatively pure powdered alumina, deforming the ring by uni-directional pressing at a pressure of about 5600 p.s.i. to thereby compress the sodium-potassium niobate, heating the alkali niobate to a temperature within the range of 2030° to 2050° F. simultaneously with said pressing operation, maintaining the mass at said elevated temperature and pressure for a period of 20–30 minutes, and cooling the mass to an ambient temperature.

References Cited by the Examiner

FOREIGN PATENTS 613,273    1/61    Canada.

OTHER REFERENCES

Journal of the American Ceramic Society, May 1952, vol. 45, No. 5, pages 209–213 relied upon.

ROBERT F. WHITE, *Primary Examiner.*

ALEXANDER H. BRODMERKEL, *Examiner.*